Figure 1:
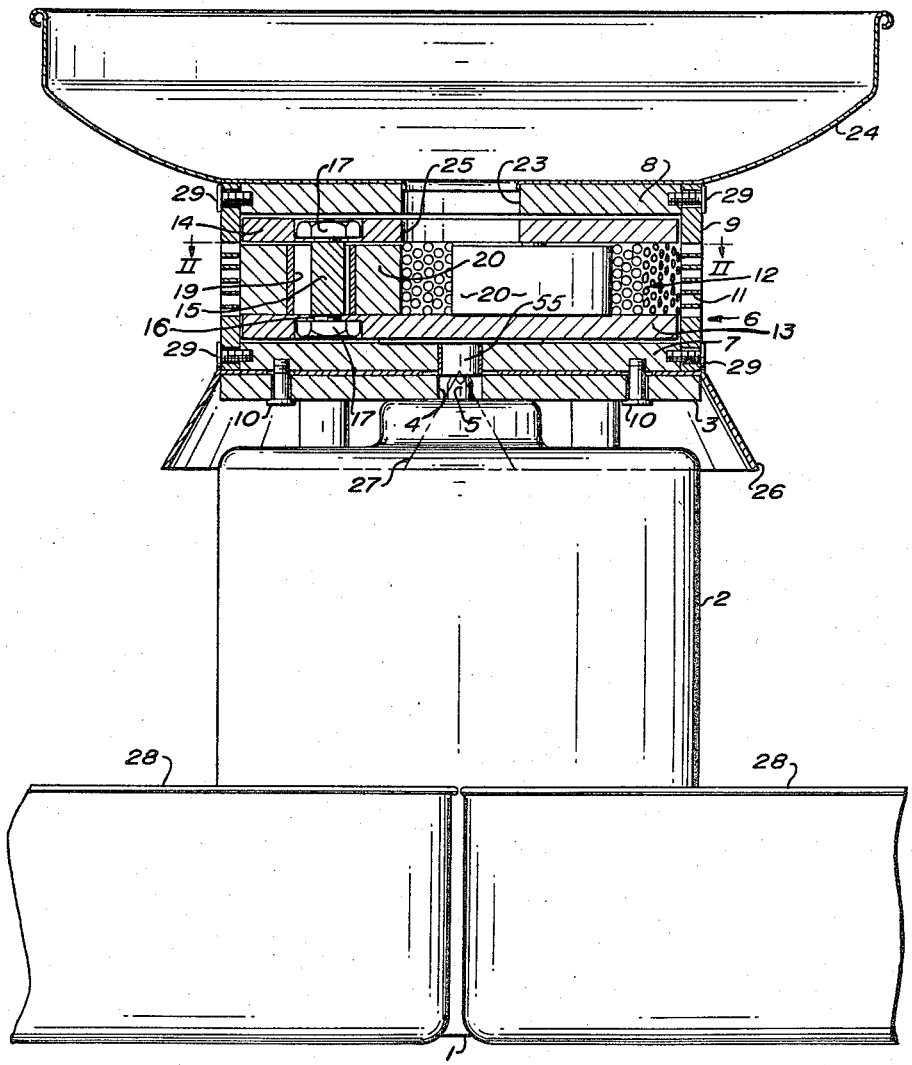

March 24, 1959     C. O. MARSHALL     2,878,846
CENTRIFUGAL FORCED MEAT CHOPPING MACHINE
Filed Dec. 8, 1953     6 Sheets-Sheet 1

INVENTOR.
CHARLES O. MARSHALL
BY
Marshall, Marshall and Yeasting
ATTORNEYS

March 24, 1959
C. O. MARSHALL
2,878,846
CENTRIFUGAL FORCED MEAT CHOPPING MACHINE
Filed Dec. 8, 1953
6 Sheets-Sheet 2
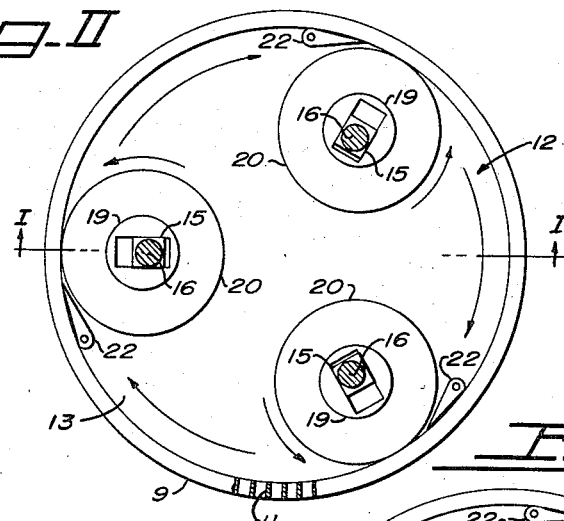
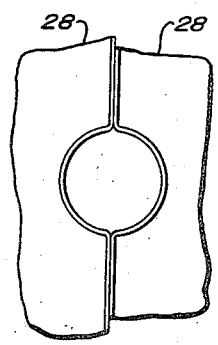
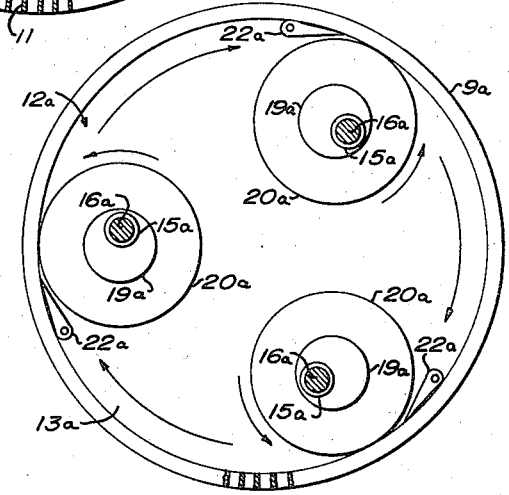
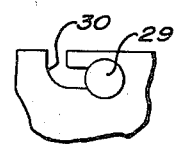
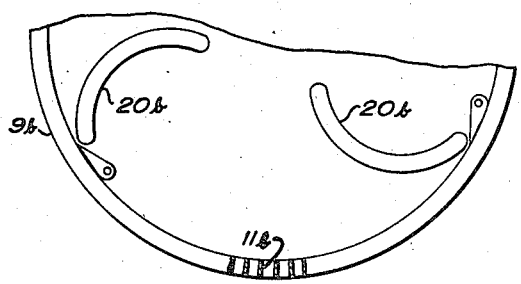
INVENTOR.
CHARLES O. MARSHALL
BY
Marshall, Marshall and Yposting
ATTORNEYS

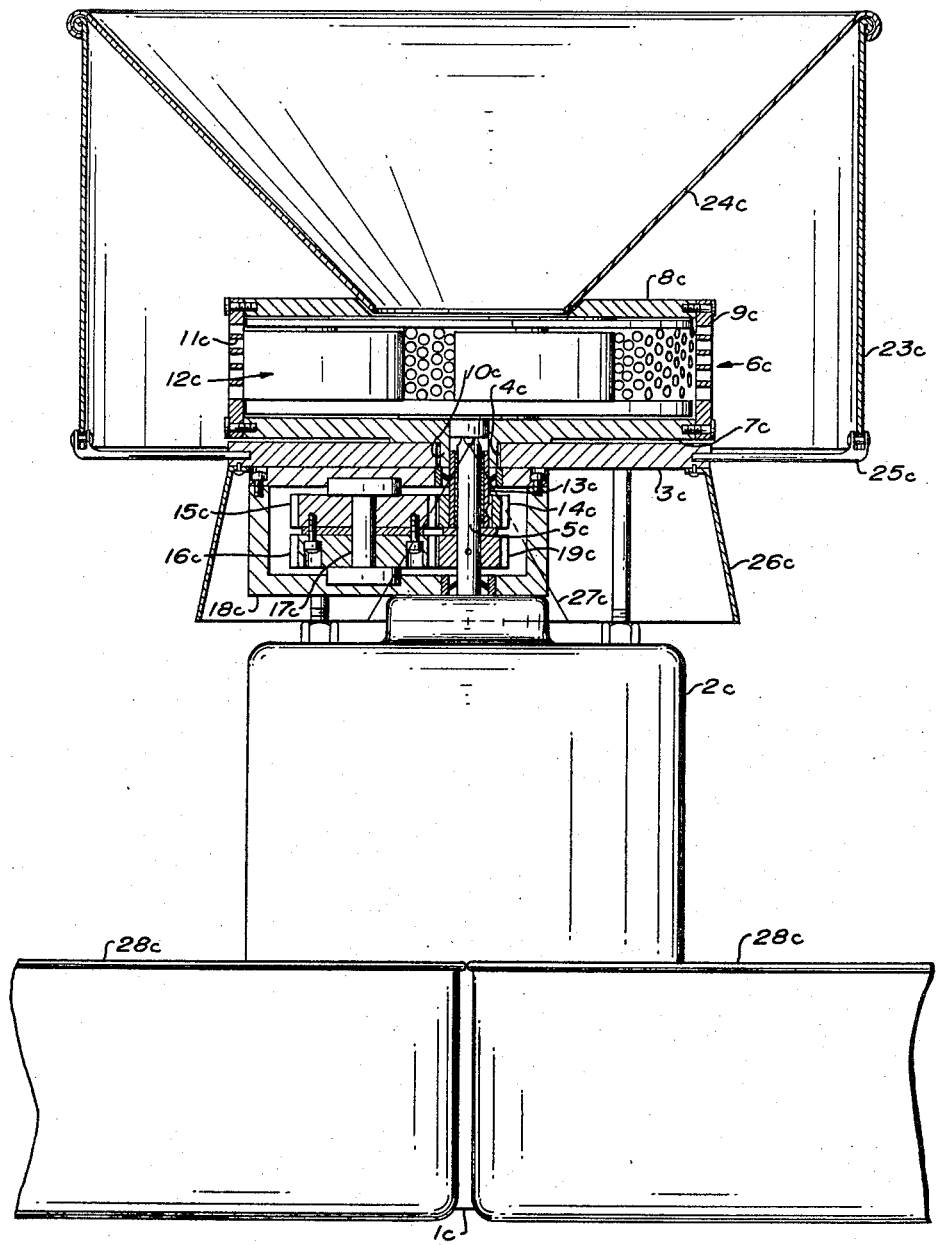
Fig. VII

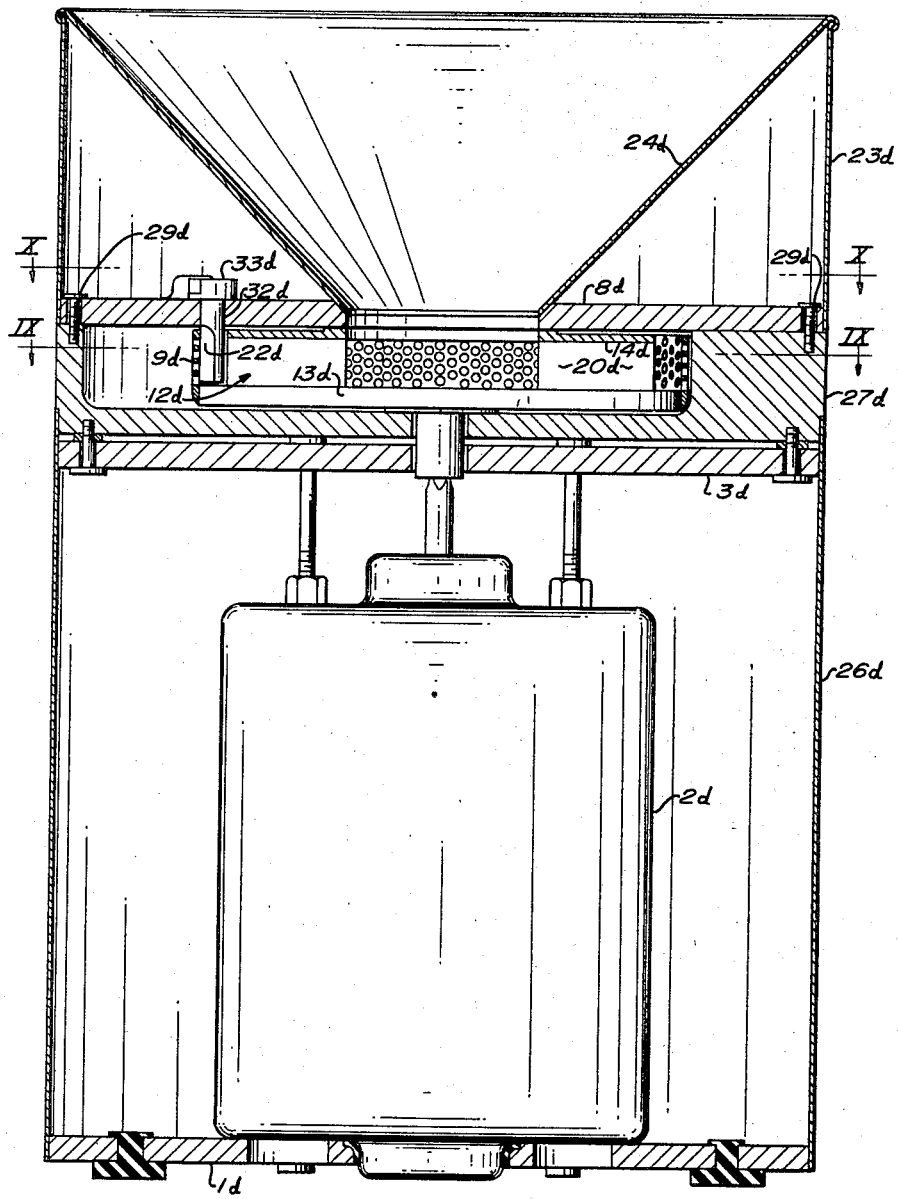

March 24, 1959 C. O. MARSHALL 2,878,846
CENTRIFUGAL FORCED MEAT CHOPPING MACHINE
Filed Dec. 8, 1953 6 Sheets-Sheet 5
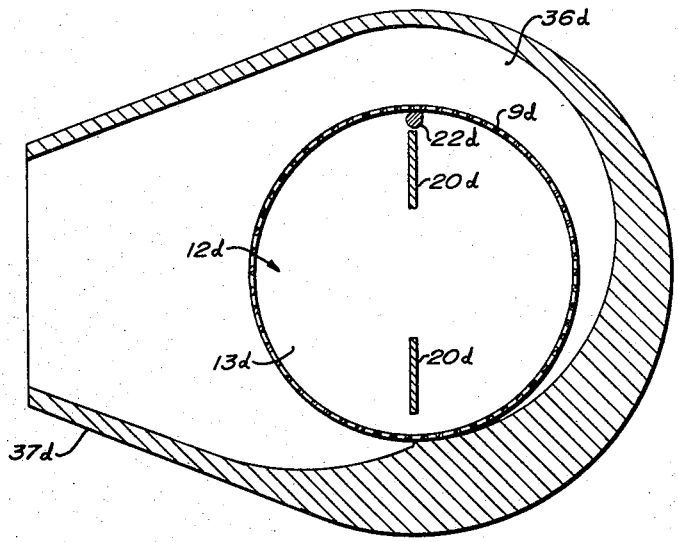
Fig. IX
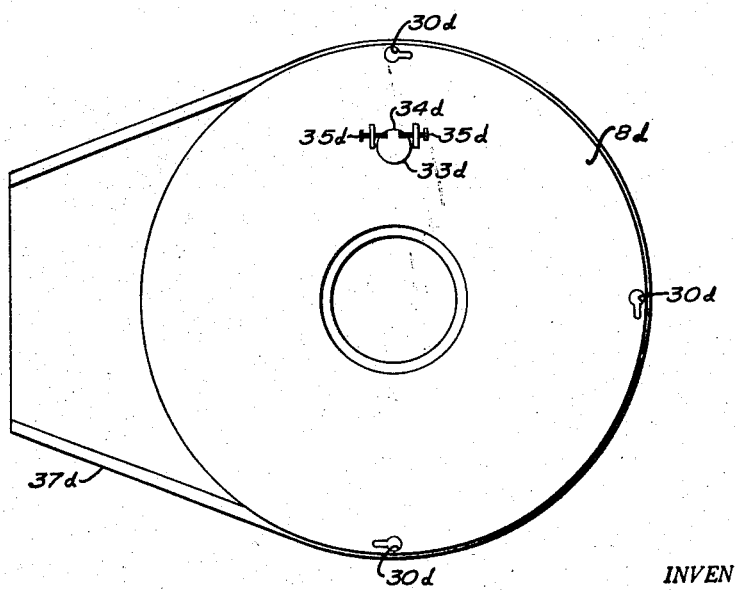
Fig. X
INVENTOR.
CHARLES O. MARSHALL
BY
Marshall, Marshall and Yeasting
ATTORNEYS March 24, 1959 C. O. MARSHALL 2,878,846
CENTRIFUGAL FORCED MEAT CHOPPING MACHINE
Filed Dec. 8, 1953 6 Sheets-Sheet 6
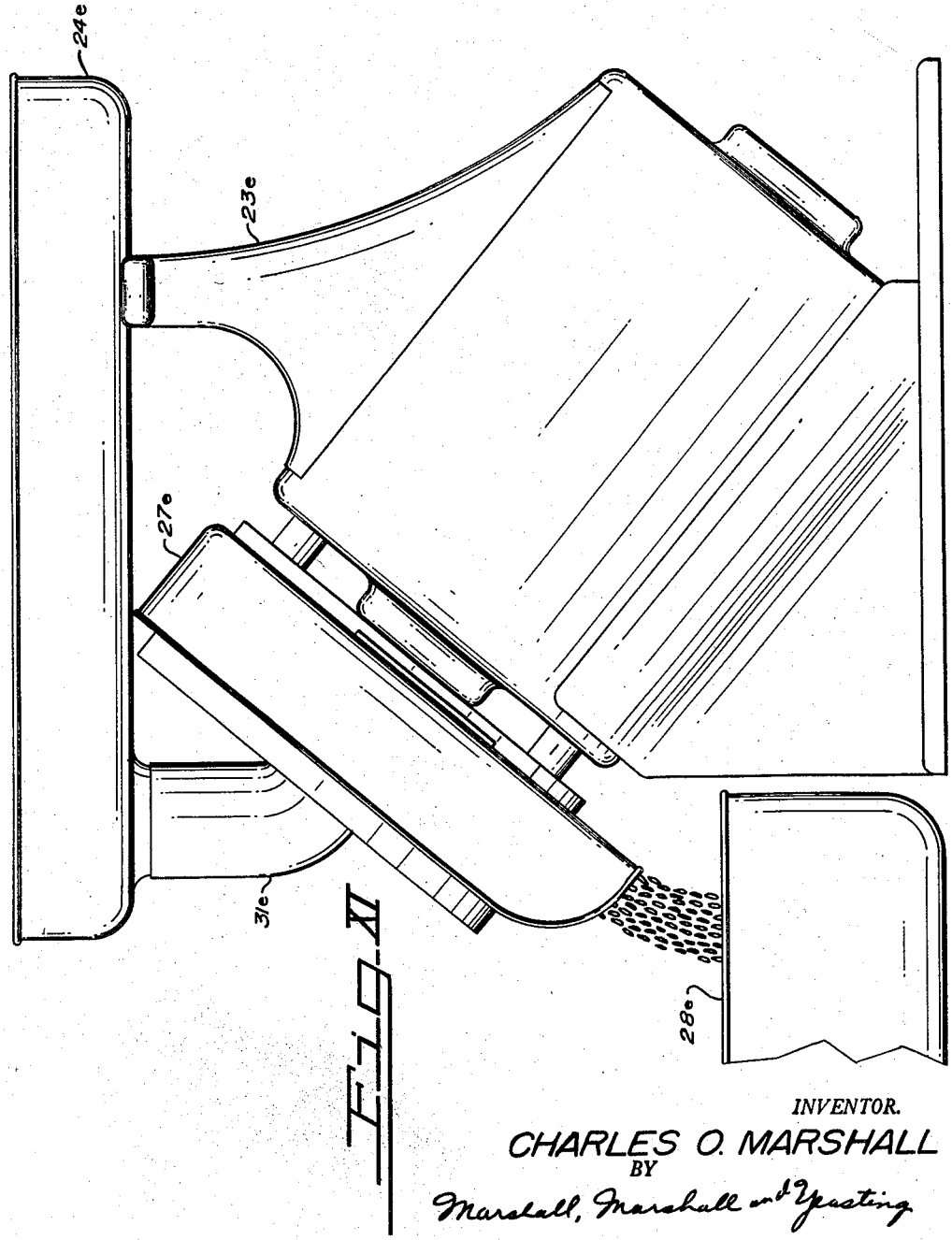
INVENTOR.
CHARLES O. MARSHALL
BY
Marshall, Marshall and Yeasting
ATTORNEYS

United States Patent Office 2,878,846
Patented Mar. 24, 1959

2,878,846

CENTRIFUGAL FORCED MEAT CHOPPING MACHINE

Charles O. Marshall, Toledo, Ohio, assignor, by mesne assignments, to Toledo Scale Corporation, Toledo, Ohio, a corporation of Ohio Application December 8, 1953, Serial No. 396,897

15 Claims. (Cl. 146—124)

This invention relates to meat chopping machines and particularly to machines in which meat is pressed against perforated members so that nodules of the meat are forced into perforations, after which the nodules are cut off by knives sliding over the surfaces of the perforated members.

In the type of machine most widely used the meat is fed into a hopper from whence it is conveyed through an internally ribbed barrel by means of a screw which compresses the meat against a perforated plate at the discharge end of the barrel. Nodules of meat which are forced into the perforations in the plate are cut off by a star-shaped knife that is carried by the screw and slides over the inside surface of the plate.

The first screw type choppers were hand operated. When choppers of that type were motorized it was necessary to interpose speed reducing gearing between the motors and the screws, because meat was fed to the screws from their peripheries and rapidly whirling screws would kick meat back into the hopper throats. The high speeds of motor shafts cannot be utilized fully to speed up output of screw machines. Their output can be increased further only by making them bigger.

When turned slowly the chopper screws operate quite effectively on chunks of meat but, for the same reason that a wood screw which is effective in a block of wood is ineffective in sawdust, the chopper screws are not very effective to push previously chopped meat through the perforated plates. It is often necessary to push previously chopped meat along the screws manually by means of stompers.

In order to prevent the blades of the star-shaped knife of the screw type machine from sliding over tough tissue that becomes matted against the inside surface of the plate, the plate and knife must be tightly jammed together. The plate can be jammed against the center of the star-shaped knife with as much force as is desired, but since the blades are flexible their tips tend to spring back so that the plate and tips are jammed together only lightly. In the larger machines it is necessary either to make the inside surface of the plates concave or to curve the blades so that the plates will engage the knives initially at the tips of the blades and the blades will be bent back as the plates and knives are jammed together. This lessens the tendency of the blades to ride over matted tough fiber but is a rather unsatisfactory expedient.

Objects of this invention are to provide a meat chopping machine in which meat to be pressed into engagement with a perforated member is conveyed from the center of a whirling expeller to its periphery; in which centrifugal force generated by a whirling expeller is utilized to press meat into perforations; in which meat is positively pressed into perforations by rolling action; which sucks previously chopped meat from a hopper and forces it positively through cutting mechanism; which distributes unlike chunks of meat and fat to make a mixture that is more homogeneous than that produced by processing similar chunks on a screw type chopping machine; which has knives the blades of which are supported at both ends and pressed against perforated members along their entire edges so that it is unnecessary to distort the blades to hold them against the perforated member; which has an output much greater than that of a screw type machine of comparable size; which is smaller and less costly to manufacture than any screw type machine of comparable output; which is less liable than screw type machines to mutilate the hands of operators; which is stable and not liable to be tipped over in use; which is easily disassembled for refrigeration and sterilization.

Other objects and advantages will be apparent from the following description in which reference is had to the accompanying drawings.

In the drawings:

Fig. I is a side view partly in section on the line I—I of Fig. II illustrating a chopping machine of my invention.

Fig. II is a sectional plan view of the upper part of the machine shown in Fig. I taken as indicated by the line II—II of Fig. I, chopped meat receiving pans shown in Fig. I being omitted from Fig. II.

Fig. III is a fragmentary plan view on a reduced scale of the juxtaposed ends of a pair of pans to be used to receive chopped meat discharged from the machine shown in Figs. I and II.

Fig. IV is a fragmentary detail view showing the manner in which parts of the machine are detachably fastened together by means of bayonette joints.

Fig. V is a sectional plan view similar to Fig. II showing a modified form of expeller.

Fig. VI is a fragmentary plan view showing another form of expeller with its top plate removed.

Fig. VII is a side elevation partly in section illustrating a chopping machine of lower capacity in which gearing is employed to reduce horsepower requirements.

Fig. VIII is a side view partly in section showing a form of meat chopping machine in which the knife is stationary and the perforated member revolves.

Fig. IX is a sectional plan view on a reduced scale taken as indicated by the line IX—IX of Fig. VIII showing the machine with the hopper removed.

Fig. X is a sectional plan view on a reduced scale taken as indicated by the line X—X of Fig. VIII.

Fig. XI is a side elevational view showing a modified form of device in which the motor shaft is not vertical.

This description and the accompanying drawings disclose and illustrate preferred forms of the invention but are not intended to limit the scope of the invention.

In the form of device illustrated in Figs. I and II the machine has a base 1 upon which is mounted a motor 2 having its shaft extending vertically. Fixed to the upper end of the shell of the motor 2 is a disk 3 having a central clearance hole 4 through which the upper end of the vertical motor shaft 5 extends.

An expeller casing 6 having a floor plate 7, a ceiling plate 8 and an annular side wall 9 is removably mounted upon the disk 3 by means of a plurality of headed studs 10 which are received in buttonhole shaped openings in the disk 3. The annular side wall 9 is a detachable band having perforations 11 which are drilled in a honeycomb pattern that extends entirely around the band.

Revolubly mounted within the casing 6 is an expeller 12 having a bottom plate 13 and a top plate 14 which are held together and spaced from each other by three square struts 15 having reduced ends forming tenons 16 which are received in holes in the bottom plate 13 and the top plate 14 and are suitably fastened therein as by nuts 17 or by welding or other means.

Surrounding each square strut 15 is a spindle 19 having a rectangular opening the lesser dimension of which corresponds to the thickness of the strut while the greater dimension of the opening permits the spindle to move radially of the expeller. The outer surface of each spindle 19 is round and journaled upon the spindle is a cylindrical roller 20 which, when the expeller 12 is revolving, rolls around the inside of the stationary perforated band 9.

The rollers 20 may be smooth as shown or they may be knurled. They function to centrifuge the meat from the center to the periphery of the expeller and they then function by their roller action to push the meat positively into the perforations 11 of the casing side wall 9.

Centrifugal force causes the rollers to press outwardly, and radial outward and inward movements of the rollers are permitted by the clearance between the square struts 15 and the inmost and outmost sides of the openings in the spindles 19 on which the rollers are journaled.

At 1750 r.p.m. a two pound roller so mounted will exert adequate pressure on a seven, eight or nine inch band. If the pressure is insufficient to force all of any piece of meat into the perforations the first time the roller encounters it, the roller will ride over the portion left inside the band and more of the piece will be pressed into the perforations during successive revolutions.

In this centrifugal chopping machine with the expeller 12 having rollers 20 force is applied momentarily to the meat over each of the perforations to drive a nodule into the perforation somewhat as a nail is driven by a momentary impulse. In a screw chopper a steady pressure is applied to the meat lying against the plate over all of the perforations. Driving the nodules into the perforations by successive impulses from the rollers 20 requires less power than forcing the same amount of meat unremittingly into all of the perforations at once by action of a screw. The prime mover requirements for the two actions compare like the prime mover requirements of a hammer forge compared with the prime mover requirements of a metal extrusion press.

The rollers 20 as they roll around the interior of the side wall 9 are followed by knives 22 which cut the protuberances of meat filling the perforations 11 away from any residue remaining upon the inner surface of the side wall and shave such residue off of the inner surface. The edges of the knives 22 are held tightly against the inner surface of the side wall 9. Each knife is mounted at one end in the bottom plate 13 and at its other end in the top plate 14. Neither end can spring away from the perforated side wall as the free tips of the knives of screw type choppers spring away from their perforated plates to slide over tough meat fibers.

The frequency with which the nodules are cut off also affects the power required to force the nodules into the perforations. It requires more power to force one nodule ⅜ inch into a perforation than to force 3 nodules successively ⅛ inch into the same perforation. The centrifugal chopper knives can be made to cut off the nodules more frequently than the screw chopper knives.

The ceiling plate 8 of the expeller casing 6 has a central opening 23 through which meat can be fed from a hopper 24 which may be secured to the ceiling plate 8 by welding or otherwise. The top plate 14 of the expeller has an opening 25 which registers with the opening 23 of the ceiling plate 8.

Meat that drops through the opening is instantly whisked away by centrifugal action. Hence there should be no occasion for an operator to push his hand into the opening. If a curious person should stick his fingers into the opening while the machine is running the mechanism adjacent the opening is not liable to mutilate them as a screw would do.

Since the meat is fed into the center of the expeller, instead of being pushed in from the periphery as it is in screw type choppers, the expeller can operate at the speed of the motor. The upper end of the motor shaft 5 therefore is connected directly to a boss 55 formed on the bottom plate of the expeller and journaled in the floor 7 of the expeller casing.

No power is consumed in operating gearing, in grinding between a screw and a fluted barrel or in overcoming the friction of end thrust or the jamming of a plate against the knife end of a screw.

Chopped meat extruded through the perforated annular side wall 9 falls over a slanting skirt 26 which extends around the upper part of the motor 2. The skirt has a pair of inverted trough shaped embossments 27 (one of which is shown in dash lines in Fig. I) which direct the chopped meat laterally so that it does not fall between the juxtaposed ends of pans 28. The pans 28 have their juxtaposed ends formed (as shown in Fig. III) to surround the motor.

To remove the hopper 24 with the attached ceiling plate it is only necessary to twist the hopper slightly and lift it off. Similarly the perforated band 9 can be twisted slightly and lifted off of the floor 7. The bayonet joints which connect the floor plate 7 and the ceiling plate 8 to the band 9 consist of headed studs 29 and slots 30. (See Fig. IV.) The slots 30 are so directed that the operation of the machine tends to tighten the connections. The headed studs 29 can be arranged if desired to be screwed in for tightening the heads of the studs against the band thus clamping it against accidental release. The expeller 12 can be lifted either before or after the band 9 is removed. When the expeller is removed it is no longer confined by the band 9 but is open all around and easily rinsed out. The band 9 is readily interchangeable with bands having smaller or larger perforations.

Because the band 9 has many more perforations than the plate of a screw-type machine of comparable size and because the knives 22 pass over all of the perforations more often than do the knives of a screw-type chopper and because the meat passes through the expeller 12 more rapidly than through a screw, the output of the machine above described is many times greater than that of a screw-type machine of comparable size.

Each perforated band 9 costs more than a disk-like perforated plate but while the unit cost of the band is higher its life in tons of output is so much greater that the cost of perforated bands per ton of output is much less than the cost of plates. For high production operation a band costing two or three times as much as a plate is nevertheless more economical than the plate if it will process five or six times as much meat before requiring replacement.

The power consumed per pound of meat in cutting off nodules depends upon the number of nodule cuts per pound of meat and the resistance of the meat to the passage of the knife. In the centrifugal chopper the pressure on the meat is relieved as the roller moves away from the perforations into which the nodules have been driven. The knife edge severs the nodules just after the pressure reaches its maximum and the meat from which the nodules have been severed then ceases to be compacted and can flow over the body of the knife comparatively freely. In the screw chopper the body of the knife must be pushed continuously through a compacted mass of meat. It is like stirring a stiff mass with the agitator of a mixer.

Fig. V illustrates a modification of the expeller having rollers 20a journaled on spindles 19a which, instead of being slidably mounted on square struts are mounted on round struts 15a. The round struts 15a are rigidly fastened to the top and bottom plates of the expeller by means of tenons 16a in the same manner as are the square struts of the form shown in Figs. I and II. The spindles 19a have eccentric bores which are journaled upon the round struts so that the spindles may rock thereon for in-and-out pivotal movement.

The modification illustrated in Fig. V is superior to that illustrated in Figs. I and II but the modification illustrated in Figs. I and II is easier to understand and for that reason was described first.

Fig. VI illustrates a form of device in which curved vanes 20b are employed instead of rollers to centrifuge the meat. The curved vanes press the meat into the perforations 11b in the sidewall 9b by troweling action. An expeller with curved vanes instead of rollers can be cast in one piece and thus produced at less cost than an expeller employing rollers. The expeller with curved vanes however is in some respects inferior to the expeller employing rollers.

Whether the knives of a centrifugal chopping machine cut more and shorter or fewer and larger nodules can be governed to some extent by design. One, two, three or perhaps more, knives can be employed. Rollers can be made heavier or lighter.

In the centrifugal chopper the meat slides freely and directly a mere three, four or five inches from the inlet to the perforated member while in the screw chopper it is forced much farther through the spiral channels in the screw and the flutes in the barrel. In the centrifugal chopper successive portions of the meat are crushed momentarily directly against the perforated member while in the screw chopper the meat is macerated as it passes through the machine. It then is held continuously under pressure at the exit end. The power requirements per pound of output for those entirely different actions cannot be computed mathematically but they are unquestionably less for the centrifugal mechanism.

The mechanism of the centrifugal machine illustrated in Figs. I and II has no gearing. The mechanism for moving the meat from the inlet to the exit operates largely with rolling friction rather than with sliding friction. There are no axial thrust components in the pressure system of the centrifugal machine.

While the horsepower requirements per pound of meat chopped are less for the centrifugal chopper than for the screw chopper, the centrifugal chopper is capable of handling so much more meat per minute than a screw chopper of comparable size that it would require more horsepower if fed several times as much meat per minute as the screw chopper is capable of handling. Horsepower requirements can of course be varied by interposing simple spur gearing between the motor and the expeller.

Changing the speed of the expeller also changes the centrifugal effect. Where it is desired to reduce horsepower requirements without changing the speed of the expeller and thus changing its centrifugal effect, this can be done by employing spur gearing to turn the perforated band at a speed somewhat slower than the speed of the expeller. A machine employing gearing for this purpose is illustrated in Fig. VII.

The machine illustrated in Fig. VII has a base 1c and a motor 2c of suitable horsepower. Fixed to the upper end of the shell of the motor 2c is a disk 3c having a central hole 4c through which the upper end of the vertical motor shaft 5c extends.

An expeller casing 6c having a floor plate 7c, a ceiling plate 8c and an annular side wall 9c is rotatably mounted above the disk 3c by means of a boss 10c which is journaled in the hole 4c of the disk 3c. The annular side wall 9c is a detachable band having perforations 11c drilled in a honeycomb pattern which extends entirely around the band. Revolubly mounted within the casing 6c is an expeller 12c constructed like the expeller illustrated in Fig. II or Fig. V, which have already been described.

The expeller casing 6c instead of being stationary is clutched to the upper end of a sleeve 13c which is journaled on the upper end of the motor shaft 5c and to which is keyed a pinion 14c that meshes with a gear 15c which is fixed to a companion gear 16c, the two gear cluster thus formed being journaled upon a shaft 17c which is mounted in a gear casing 18c attached to the lower side of the disk 3c. The gear casing also contains the above-mentioned pinion 14c and another pinion 19c that is pinned to the motor shaft. The train of pinions and gears may have any ratio desired. If for example the gear ratio is such that the pinion 14c turns one-tenth slower than the pinion 19c, the expeller casing 6c will revolve one-tenth slower than the expeller 12c.

Centrifugal force causes the rollers of the expeller to press outwardly in the manner already explained in the description of the forms shown in Figs. II and V. While the centrifugal force pressing the rollers against the side wall 9c is just as great as though the side wall were stationary, the rollers and the knives which follow them move relative to the perforated side wall with one-tenth the speed with which the rollers and knives move around the stationary side wall in the form shown in Fig. I. Since the knives cut off only one-tenth as many nodules per second in the machine with the rotating perforated side wall as do the knives in the machine with the stationary side wall, the horsepower required for cutting off the nodules is only about one-tenth as great.

A cylindrical guard 23c serves to catch such chopped meat as may spray from the perforations of the side wall 9c. The cylindrical guard 23c also serves to support the hopper 24c from which meat is sucked by centrifugal action into the chopping mechanism, the cylindrical guard 23c being in turn supported by rigid arms 25c which extend radially from the stationary disk 3c. Chopped meat extruded through the annular side wall and dropping downwardly falls over a skirt 26c which deflects the meat from the motor 2c. The skirt has a pair of inverted trough-shaped embossments 27c (one of which is shown in dash lines on Fig. VII) which direct the chopped meat laterally so it does not fall between pans 28c having their juxtaposed ends formed to surround the motor 2c. Chopped meat caught by the guard 23c also falls into the pans 28c.

The cylindrical guard 23c and the hopper 24c can be removed by twisting them slightly and lifting them off of the arms 25c. The ceiling plate 8c and the perforated band 9c can be removed in a similar manner. The bayonet joints which connect the ceiling plate 8c to the band 9c and the band 9c to the floor plate 7c are so directed that the operation of the machine tends to tighten the connections, and the connections can be arranged to be tightened in the manner explained in the description of the device shown in Figs. I and IV. When the expeller is removed it is no longer confined by the side wall 9c but is open all around and easily rinsed out. The band 9c is readily interchangeable with bands having smaller or larger perforations.

The form of centrifugal chopper illustrated by Figs. VIII, IX and X differs from the forms previously described in that the perforated band 9d rotates with and constitutes a part of the expeller 12d while the knife 22d is stationary. In the device illustrated by Figs. VIII, IX and X the base 1d supports a motor 2d which in turn supports a stationary disk 3d. Secured to and overlying the disk 3d is a chute 27d from which depends a cylindrical skirt 26d.

The expeller 12d includes a bottom plate 13d and a top plate 14d which are spaced from each other by vanes 20d. The vanes 20d are shown in Fig. IX as straight but they may be curved if desired for greater centrifugal effect.

The perforated band 9d is fixed to the bottom plate 13d but is spaced from the top plate 14d to leave an annular opening into which the knife 22d projects. The knife 22d is mounted in a ceiling plate 8d which is removably secured, by means of studs 29d and bayonet joint slots 30d, upon the chute 27d.

The knife 22d has a round shank 32d and a head 33d having a nose 34d which is clamped between adjusting screws 35d (as indicated in Fig. X). By loosening one of the screws 35d and tightening the other the knife edge can be forced against the inside of the perforated band 9d with such pressure as is necessary for proper shaving effect.

The ceiling plate 8d has a central opening through which meat can be fed from a hopper 24d which is secured to a cylindrical stabilizer 23d. The hopper 24d and the stabilizer 23d may be lifted from the ceiling plate 8d to give access to the mounting and adjusting screws 35d for the knife 22d.

The chute 27d has a corniform channel 36d into which the chopped meat is thrown by the whirling band 9d. The channel 36d leads to a spout 37d from which the chopped meat is discharged.

While for the sake of compactness, economy of manufacture and stability in operation, the forms of device hereinbefore described have been arranged with the motor shaft extending vertically upward, similar machines can be made with motor shafts extending horizontally, vertically downward or in any other direction. Illustrated in Fig. XI for example is a machine having its motor shaft tilted at an angle to the vertical. The centrifugal mechanism of the machine is like the mechanism illustrated in Fig. I except that the angular position of the motor and its shaft and the parts turned thereby requires a differently constructed hopper support 23e, a differently shaped hopper 24e, a chute 27e to direct chopped meat into a pan 28e and a curved tube 31e to guide meat to be processed to the center of the chopping mechanism.

The invention above set forth is susceptible of other modifications within the spirit and scope of the subjoined claims.

Having described the invention, I claim:

1. In a meat chopping machine, in combination, a member having an even surface pierced by numerous perforations adapted to receive nodules of meat, a knife sliding over said even surface for severing nodules of meat that enter such perforations, centrifugally acting means located within the member for moving meat toward said even surface, and means carried by said centrifugally acting means for pressing such meat against said even surface to force nodules thereof into such perforations.

2. In a meat chopping machine, in combination, a member having an even surface pierced by numerous perforations adapted to receive nodules of meat, centrifugally acting means located within the member for moving meat toward said even surface, means traveling adjacent said member and supported on said centrifugally acting means for then pressing such meat against said even surface to force nodules of meat into such perforations, a knife slidable over such even surface to sever the nodules which have been so forced into such perforations, and means located above said centrifugally acting means for guiding meat to be processed into said centrifugally acting means.

3. In a meat chopping machine, in combination, a rigid member having an even surface pierced by numerous perforations adapted to receive nodules of meat, centrifugally acting means located within the member for moving meat toward said even surface, means carried by said centrifugally acting means and movable over said even surface to press such meat thereagainst and thereby force nodules of such meat into such perforations, means carried by said centrifugally acting means and traveling over said even surface for severing the nodules so forced into such perforations, and means located above said centrifugally acting means for guiding meat to be processed into said centrifugally acting means.

4. In a meat chopping machine, in combination, a rigid member having an even surface pierced by numerous perforations adapted to receive nodules of meat, centrifugally acting means located within the member for moving meat toward said even surface, means carried by said centrifugally acting means and having a curved surface movable over said even surface for pressing such meat against said even surface to force nodules of said meat into such perforations, and means carried by said centrifugally acting means and traveling over said even surface for severing the nodules so forced into such perforations.

5. In a meat chopping machine, in combination, a rigid member having a curved inner surface pierced by numerous perforations adapted to receive nodules of meat, centrifugally acting means for forcing meat against said curved inner surface, means carried by said centrifugally acting means for engaging said meat and exerting additional pressure upon said meat to force nodules thereof into such perforations, and means carried by said centrifugally acting means and traveling in juxtaposition to said curved inner surface for severing nodules of meat which enter such perforations.

6. In a meat chopping machine, in combination, a stationary rigid member having a curved inner surface pierced by numerous perforations adapted to receive nodules of meat, centrifugally acting means for moving meat against said curved inner surface, means carried by said centrifugally acting means and having a curved outer surface moving over the said curved inner surface for pressing nodules of such meat into such perforations, and means for severing nodules of meat which enter such perforations.

7. In a meat chopping machine, in combination, a stationary rigid member having a substantially cylindrical surface pierced by numerous perforations adapted to receive nodules of meat, centrifugally acting means located within the member for forcing meat against said substantially cylindrical surface, vanes carried by said centrifugally acting means for pressing said meat against the surface of said member, and means for severing nodules of meat which enter such perforations.

8. In a meat chopping machine, in combination, a rigid member having a substantially cylindrical surface pierced by numerous perforations adapted to receive nodules of meat, centrifugally acting means located within the member for moving meat against said substantially cylindrical surface, means carried by said centrifugally acting means for exerting additional pressure upon said meat to force nodules thereof into such perforations, and means for severing nodules of meat which enter such perforations, said means for severing nodules traveling within and in juxtaposition to said substantially cylindrical surface.

9. In a meat chopping machine, in combination, a rigid member having a substantially cylindrical surface pierced by numerous perforations adapted to receive nodules of meat, centrifugally acting means for moving meat against the interior of said substantially cylindrical surface, means having a curved outer surface moving over the interior of said substantially cylindrical surface for pressing nodules of such meat into such perforations, and means for severing nodules of meat which enter such perforations, said means for severing nodules traveling within and in juxtaposition to said substantially cylindrical surface.

10. In a meat chopping machine, in combination, a member having a substantially cylindrical inner surface pierced by numerous perforations adapted to receive nodules of meat, rotating mechanism for centrifuging meat toward said inner surface, said rotating mechanism including means rolling over said inner surface to press meat thereagainst and thereby force nodules of such meat into such perforations, and means for severing nodules of meat which enter such perforations.

11. In a meat chopping machine, in combination, a casing having a side wall with a substantially cylindrical inner surface pierced by numerous perforations, a rotatable expeller within said casing, said expeller including rollers which roll around the cylindrical inner surface of said side wall, and means for severing nodules of meat which enter such perforations.

12. In a meat chopping machine, in combination, a casing having a side wall with a substantially cylindrical inner surface pierced by numerous perforations, a rotatable expeller within said casing, said expeller including rollers which roll around the cylindrical inner surface of said side wall, said rollers being capable of in and out bodily movement, and means for severing nodules of meat which enter such perforations.

13. In a meat chopping machine, in combination, a casing having a side wall with a substantially cylindrical inner surface pierced by numerous perforations, and a rotatable expeller within said casing, said expeller including rollers which roll around the cylindrical inner surface of said side wall, said rollers being capable of in and out bodily movement, said expeller carrying knives which slide over the cylindrical inner surface of said side wall for severing nodules of meat which enter such perforations.

14. In a meat chopping machine, in combination, a member having a curved inner surface pierced by numerous perforations, an expeller which includes a roller which rolls over said curved inner surface, said roller being journalled upon a spindle which is mounted for pivotal movement toward and away from the center of curvature of said curved inner surface, and means for severing nodules of meat which enter such perforations.

15. In a meat chopping machine, in combination, a member having a substantially cylindrical inner surface pierced by numerous perforations, a rotatable expeller to move meat against said inner surface and force it through such perforations, said expeller including a roller which rolls around said cylindrical inner surface, said roller being journalled on a spindle, means for mounting said spindle for pivotal in and out movement, and means for severing nodules of meat which enter such perforations.

References Cited in the file of this patent
UNITED STATES PATENTS

| Number | Name | Date |
|---|---|---|
| 352,023 | Woodruff | Nov. 2, 1886 |
| 506,746 | Stearnes | Oct. 17, 1893 |
| 1,015,337 | Pancoast | Jan. 23, 1912 |
| 1,290,732 | Gants et al. | Jan. 7, 1919 |
| 1,402,914 | Trust et al. | Jan. 10, 1922 |
| 1,966,721 | Heyman | July 17, 1934 |
| 2,282,887 | Roberts | May 12, 1942 |
| 2,307,721 | Weirauch | Jan. 5, 1943 |
| 2,637,359 | Taylor | May 5, 1953 |
| 2,658,542 | Urschel | Nov. 10, 1953 |